US011395212B2

(12) United States Patent
Svedman et al.

(10) Patent No.: US 11,395,212 B2
(45) Date of Patent: Jul. 19, 2022

(54) METHOD AND SYSTEM FOR PERFORMING MEASUREMENTS BASED ON SYNCHRONIZATION SIGNAL PROPERTIES

(71) Applicant: ZTE Wistron Telecom AB, Kista (SE)

(72) Inventors: Patrick Svedman, Kista (SE); Yonghong Gao, Kista (SE); Jan Johansson, Kista (SE); Thorsten Schier, Kista (SE); Aijun Cao, Kista (SE); Bojidar Hadjiski, Kista (SE)

(73) Assignee: ZTE Wistron Telecom AB, Kista (SE)

( * ) Notice: Subject to any disclaimer, the term of this patent is extended or adjusted under 35 U.S.C. 154(b) by 150 days.

(21) Appl. No.: 15/127,374

(22) PCT Filed: Mar. 26, 2015

(86) PCT No.: PCT/US2015/022772
§ 371 (c)(1),
(2) Date: Sep. 19, 2016

(87) PCT Pub. No.: WO2015/148815
PCT Pub. Date: Oct. 1, 2015

(65) Prior Publication Data
US 2017/0181065 A1 Jun. 22, 2017

Related U.S. Application Data

(60) Provisional application No. 61/971,021, filed on Mar. 27, 2014.

(51) Int. Cl.
*H04W 48/12* (2009.01)
*H04J 11/00* (2006.01)
(Continued)

(52) U.S. Cl.
CPC ............. *H04W 48/12* (2013.01); *H04J 11/00* (2013.01); *H04J 11/0073* (2013.01);
(Continued)

(58) Field of Classification Search
None
See application file for complete search history.

(56) References Cited

U.S. PATENT DOCUMENTS

2012/0231790 A1* 9/2012 Lindoff ................. H04W 48/16
455/434
2015/0016339 A1* 1/2015 You ..................... H04W 56/001
370/328

(Continued)

FOREIGN PATENT DOCUMENTS

JP 2014-30132 A 2/2014

OTHER PUBLICATIONS

International Search Report/Written Opinion dated Jul. 22, 2015, in corresponding PCT Application No. PCT/US2015/022772.
(Continued)

*Primary Examiner* — Jeffrey M Rutkowski
*Assistant Examiner* — Mehedi S Aley
(74) *Attorney, Agent, or Firm* — Duane Morris LLP

(57) ABSTRACT

A serving cell configures a search window within which a UE searches to find a discovery burst. The discovery burst may include PSS, SSS, DS, CSI-RS or other signals. The UE detects synchronization signals and determines if the synchronization signals are part of the discovery burst by detecting signal properties to distinguish them from legacy or other synchronization signals. One property is the time difference between a PSS and an SSS in a discovery burst. Other properties are the frequency difference between a PSS and an SSS, and the sequence of the synchronization signals. If the UE determines that the synchronization signals are part of the discovery burst, the UE performs RRM measurements on other signals in the discovery burst, and reports the measurements results to a serving cell. The serving cell decides if a UE should be handed over to the measured cell based on the measurement reports.

30 Claims, 4 Drawing Sheets

(51) Int. Cl.
  *H04W 36/00* (2009.01)
  *H04W 56/00* (2009.01)
  *H04W 72/08* (2009.01)

(52) U.S. Cl.
  CPC ....... *H04J 11/0076* (2013.01); *H04J 11/0079* (2013.01); *H04W 36/0085* (2018.08); *H04W 36/00837* (2018.08); *H04W 56/001* (2013.01); *H04W 72/085* (2013.01)

(56) References Cited

U.S. PATENT DOCUMENTS

| | | |
|---|---|---|
| 2015/0172940 A1 | 6/2015 | Nagata et al. |
| 2015/0304932 A1* | 10/2015 | Wei ...................... H04J 11/0079 370/331 |
| 2015/0358801 A1* | 12/2015 | Seo ....................... H04W 8/005 370/329 |
| 2015/0358899 A1* | 12/2015 | Ko ...................... H04W 72/042 370/252 |
| 2016/0066255 A1* | 3/2016 | Marinier ............... H04W 48/16 370/350 |
| 2016/0360452 A1* | 12/2016 | Koorapaty ........... H04J 11/0076 |

OTHER PUBLICATIONS

ZTE, "Discovery Burst Indicator for Autonomous Time Difference Detection", Mar. 21, 2014, R1-141416, 3GPP TSG-RAN WG1 Meeting #76bis, pp. 2-4.

ZTE, "Discussion on open issues of small cell on/off and discovery", Mar. 22, 2014, R1-141405, 3GPP TSG-RAN NG1 Meeting #76bis, pp. 3-4.

Official Action dated Oct. 18, 2017 in corresponding Japanese Patent Application No. 2016-558740 with English translation of office action.

* cited by examiner

METHOD AND SYSTEM FOR PERFORMING MEASUREMENTS BASED ON SYNCHRONIZATION SIGNAL PROPERTIES

RELATED APPLICATION(S)

This application is a 371 National Phase Application from International Application No. PCT/US2015/022772, filed Mar. 26, 2015 and claims benefit of priority under 35 U.S.C. § 119(e) to U.S. provisional application Ser. No. 61/971,021, entitled Method and System for Performing Measurements Based on Synchronization Signal Properties, filed Mar. 27, 2014, the contents of which are hereby incorporated by reference as if set forth in their entirety.

TECHNICAL FIELD

The disclosure is related to wireless communication systems and methods and more particularly to identifying and distinguishing synchronization signals, and performing measurements based on properties of synchronization signals.

BACKGROUND

Wireless communication relies upon synchronization between cells and the user equipment (UE) that communicate with the cells. In LTE (Long Term Evolution) systems and protocols, there is a primary synchronization signal (PSS) and a secondary synchronization signal (SSS) available for such synchronization. These downlink signals are typically transmitted by an eNodeB (E-UTRAN Node B, also known as Evolved Node B) within every 10 ms radio frame. The PSS and SSS serve several purposes, some of which are outlined below.

A user equipment (UE) typically obtains coarse time and frequency synchronization by searching for the PSS. The SSS may also be used in this process.

Frame timing detection may be achieved as follows. For legacy, i.e. conventional single carrier operations, an LTE cell transmits the same PSS every 5 ms, i.e. twice per radio frame. Every 5 ms a cell transmits an SSS, i.e. also twice per radio frame, but only every second SSS is the same signal. Therefore, by detecting a single PSS and a single SSS, a UE can deduce the frame timing.

In many frequency division duplex (FDD) LTE systems, the SSS is transmitted as the symbol immediately before the PSS. In many time division duplex (TDD) LTE systems, the SSS is transmitted three symbols before the PSS. Hence, by detecting PSS/SSS the UE can deduce whether frequency division duplexing (FDD) or time division duplexing (TDD) is used in the cell.

Cell identity detection may also be carried out by the UE. Different sequences (i.e. signals) may be used for PSS and SSS. Different combinations of PSS and SSS sequences correspond to different physical cell IDs (PCIs). Hence, by detecting PSS/SSS the UE can deduce the PCI of the cell. In Radio Resource Management (RRM) measurements, a UE performs a measurement on the downlink. Typical RRM measurements in LTE include reference signal received power (RSRP) and reference signal received quality (RSRQ). Legacy LTE RRM measurements are based on the cell-specific reference signal (CRS). Depending on the configuration and state of the UE, the UE reports RRM measurements results to a serving cell. One purpose of RRM measurement reports is for the serving cell to decide if a UE should be handed over for communication with the measured cell.

SUMMARY

The disclosure provides novel properties and features of a synchronization signal in a discovery burst, that are distinguishable from the properties and features of a legacy synchronization signal. The disclosure provides several LTE embodiments in which modified PSS and/or SSS properties are listed. With such a design, a UE can identify and synchronize with the sending cell, carry out RRM measurements on the sending cell, and avoid mistaking other signals for a discovery burst, which could result in erroneous measurements. This could occur, for example, if the UE is configured with a discovery burst search window that is incorrect. UE procedures are specified for measurements that are conditioned on the properties of the synchronization signal. Additionally, an application for autonomous search window detection is presented.

A new mechanism for discovery and RRM Measurements is provided. A serving cell configures a search window for a UE to use to search to find a discovery burst sent by a sending cell which may be a small cell. HetNet configurations include small cells that are Low Power Nodes (LPNs). In HetNet configurations, small cell discovery must be carried out. The search window may or may not fall within a measurement gap used by the UE. The serving cell must know transmission time of the discovery burst in order to accurately configure the search window, but even if the serving cell does not know transmission time of the discovery burst, the UE need not perform multiple additional complex detection operations as would be required if the serving cell did not know transmission time, because of the advantages provided by the disclosure. The discovery burst may include PSS, SSS, DS, CSI-RS or other signals. The UE uses the PSS/SSS for various purposes related to synchronization, frame detection, FDD/TDD detection, and cell identity detection. The UE uses these signals to measure the sending cell, as detailed below.

If a UE detects a discovery burst that includes PSS or PSS/SSS, the UE is able to determine if the PSS or PSS/SSS is part of a discovery burst or if the PSS or PSS/SSS is part of a legacy signal, according to aspects of the disclosure. The UE does this by detecting properties of the synchronization signals to distinguish them from legacy synchronization signals thereby avoiding the UE mistaking legacy signals in a discovery burst for discovery signals sent by the sending cell, and performing RRM measurements on the wrong signal. One such synchronization signal property is the time difference between a PSS and an SSS in a discovery burst. Another is the frequency difference between a PSS and an SSS in a discovery burst. Another synchronization signal property is the sequence of the synchronization signals. In some embodiments, the discovery burst includes multiple PSSs and in some embodiments, the discovery burst includes multiple SSSs. In some embodiments, the discovery burst contains one or multiple PSSs and one or multiple SSSs. The UE performs RRM measurements on other signals in the discovery burst. A signal upon which the RRM measurements may be performed is referred to herein as a discovery reference signal, DRS, such as would be included inside a search window if the synchronization signal(s) are part of a discovery burst The RRM measurements include reference signal received power (RSRP) and reference signal received quality (RSRQ) measurements.

The UE reports the RRM measurements results to a serving cell. One purpose of RRM measurement reports is for the serving cell to decide if a UE should be handed over to the measured cell

BRIEF DESCRIPTION OF THE DRAWING

The present invention is best understood from the following detailed description when read in conjunction with the accompanying drawing. It is emphasized that, according to common practice, the various features of the drawing are not necessarily to scale. Like numerals denote like features throughout the specification and drawing.

DETAILED DESCRIPTION

Figure 1:
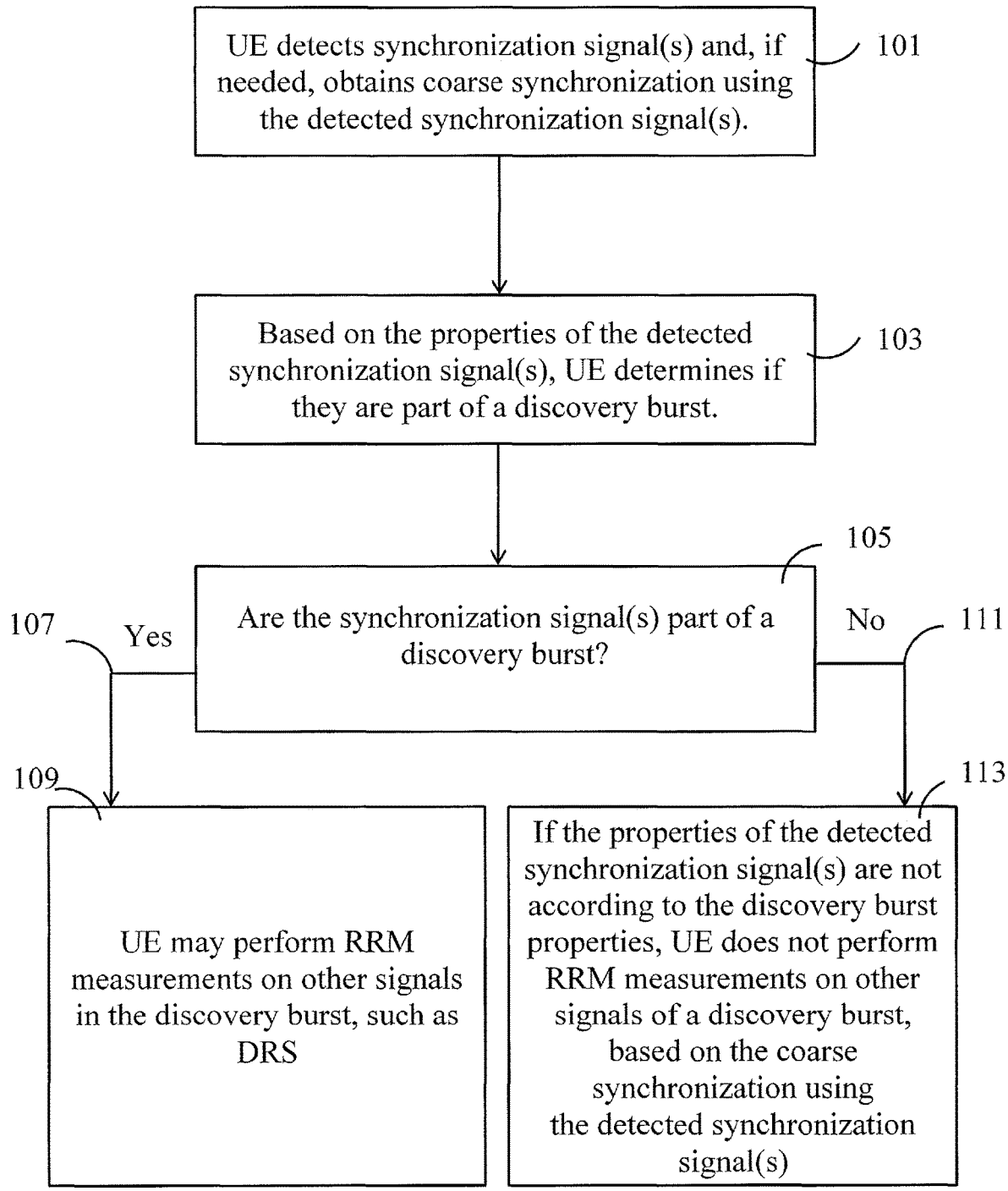
FIG. 1 is a flowchart illustrating a method according to various embodiments of the disclosure.

In 3GPP, there is ongoing work to introduce a new mechanism for discovery and RRM measurements called small cell discovery. This is as described in 7.2.4.2.2 3GPP, "Draft minutes report of 3GPP TSG RAN WG1 #76 v0.2.0 (Prague, Czech Rep., 10-14 Feb. 2014)," for example, the contents of which are hereby incorporated by reference as if set forth in their entirety. Many details and properties of 3GPP continue to be developed. The present disclosure finds application in 3GPP and in various other protocols and networks such as HetNets, but is not limited to any particular network or protocol type.

In this disclosure, the signal on which the RRM measurement is performed is denoted the discovery signal or the discovery reference signal (DRS). Examples of DRS are legacy versions or modified versions of channel state information reference signals (CSI-RS), CRS and/or positioning reference signals (PRS) in various embodiments.

In some embodiments of the disclosure, a discovery burst is transmitted with a long period. A duration of the discovery burst could be around 1 ms and typical periods could include 40, 80, 160 and 320 ms but other durations are used in other embodiments. In some embodiments, a discovery burst could also be transmitted from a cell that is otherwise off.

In other embodiments, a discovery burst consists of multiple signals such as but not limited to PSS and DRS. In such a design embodiment, a UE could use the PSS for coarse synchronization before performing RRM measurements on DRS, if needed. The UE may deduce the time and frequency location of DRS based on the time and frequency location of a detected PSS, i.e., a PSS may serve as a reference point in time and a frequency for a discovery burst.

In other embodiments, discovery bursts are transmitted from multiple different cells or transmission points. In some embodiments, these discovery bursts overlap in time. A UE could then perform RRM measurements on multiple cells or transmission points on the received aggregate discovery burst. This may involve the transmissions from the multiple cells or transmission points being sufficiently synchronized in time and frequency. In some embodiments, signals from different cells or transmission points are multiplexed in different ways such as by time, frequency or code in various embodiments. If a discovery burst contains PSS/SSS, different cells or transmission points may be multiplexed by using different sequences, i.e. different PCIs, as in legacy operations. If a discovery burst contains CSI-RS, different cells or transmission points could be multiplexed by using different time and/or frequency resources and also by using different cover codes such as described in Dahlman, Parkvall, Sköld, "4G LTE/LTE-Advanced for Mobile Broadband", Academic Press, 2011, the contents of which are hereby incorporated by reference as if set forth in their entirety.

To reduce the UE effort, complexity and power consumption, the disclosure provides for a serving cell to provide the UE with a search window in which the UE may expect to find a discovery burst. A search window could for example be a time offset in relation to the timing of the serving cell and a search window duration. With the knowledge of the discovery burst period, the UE can expect to find a sequence of discovery bursts in a sequence of search windows.

In some embodiments, the discovery burst sent by the sending cell, contains a PSS. In one embodiment where a discovery burst contains a PSS, a PSS of a discovery burst coincides in time and frequency with a legacy PSS. In other embodiments in which a discovery burst contains a PSS, a PSS of a discovery burst does not coincide in time and frequency with a legacy PSS.

In some embodiments in which a discovery burst sent by the sending cell, contains a PSS, aspects of the disclosure provide for a UE to be able to distinguish if the PSS is a part of a discovery burst, or if the PSS is a legacy PSS that is not part of a discovery burst. If a UE mistakes a legacy PSS for a PSS in a discovery burst such as may occur without the implementation of the disclosure, the UE performs a measurement on the wrong resources, which may result in erroneous measurement results. In other embodiments, a UE performs a detection operation on DRS before the measurement, in order to make sure that the measurement is done on a discovery burst. Aspects of the disclosure enable the UE to distinguish if the PSS is a part of a discovery burst or if it is a legacy PSS and this aspect of the disclosure provides an advantage over the aforementioned extra detection operation which may be complex and power consuming.

In some embodiments, a search window is provided and it is assumed that the search window contains a discovery burst, but in other embodiments, such a search window is not provided. The search window may be provided by a serving cell.

In some embodiments in which a discovery burst contains a PSS/SSS identical to a legacy PSS/SSS (i.e. the same time difference between PSS and SSS as a legacy PSS/SSS etc.), a PSS/SSS of a discovery burst coincides in time and frequency with a legacy PSS/SSS. In other embodiments in which a discovery burst contains a PSS/SSS identical to a legacy PSS/SSS, a PSS/SSS of a discovery burst does not coincide in time and frequency with a legacy PSS/SSS.

In some embodiments of the disclosure, the UE detects a property of PSS/SSS. In some embodiments, the UE learns if FDD or TDD is used by detecting the time difference between PSS and SSS. In one embodiment, where a UE may have multiple hypothesis on a PSS/SSS property, each hypothesis can be considered in accordance with legacy PSS/SSS, before it has been determined.

In some embodiments in which a discovery burst contains a PSS/SSS, aspects of the disclosure provide for a UE to be able to distinguish if the PSS/SSS is a part of a discovery burst or if it is a legacy PSS/SSS that is not part of a discovery burst. If a UE mistakes a legacy PSS/SSS for a PSS/SSS in a discovery burst such as may occur without the implementation of the disclosure, the UE may perform a measurement on the wrong resources, in one embodiment, which may result in erroneous measurement results. In some embodiments, a UE performs a detection operation on DRS before the measurement, in order to make sure that the measurement is done on a discovery burst. Aspects of the disclosure that provide for a UE to be able to distinguish if the PSS/SSS is a part of a discovery burst or if it is a legacy PSS/SSS, and provides an advantage over the aforementioned extra detection operation which may be complex and power consuming.

In some embodiments, a search window is provided and contains a discovery burst. In other embodiments, the search window does not contain the discovery burst and in still other embodiments, a search window is not provided.

In order to provide search window information, the serving cell must know the transmission time of the discovery burst, for example in relation to its own transmission timing. In some embodiments, the search window information conventionally available to the serving cell is inaccurate or wrong. If an inaccurate or wrong search window is provided to a UE, the search window would not contain a discovery burst, or at least not a complete discovery burst. In embodiments in which a discovery burst contains a part that a UE could use to distinguish if the search window contains a discovery burst, inaccurate or wrong search window information could result in that part falling outside the search window. In such an embodiment, the UE could not distinguish the discovery burst, if not for the advantages of the present invention, even though the search window partly captured the discovery burst. Thus, inaccurate search window information could result in erroneous measurements if not for the advantages of the present invention. In some embodiments, this could require a UE to undesirably perform additional detection operations to make sure that a search window contains a discovery burst if not for the advantages of the present invention.

Examples of when a serving cell does not have accurate search window information include when the base station of the serving cell and the base station(s) of the cell(s) transmitting a discovery burst are connected with a non-ideal backhaul, i.e. with considerable delay and/or jitter or when the relative time difference between the base stations changes with time for instance due to different clocks. Aspects of the disclosure are provided which avoid requiring the UE to perform additional detection operations to make sure that a search window contains a discovery burst, which is complex, due to reading a signal that is not part of the discovery burst.

One embodiment of a solution to the aforementioned issues, lies in the discovery burst design.

In some embodiments, the properties of the synchronization signals in a discovery burst are such that a UE can distinguish the synchronization signals of a discovery burst from legacy synchronization signals. In some embodiments, these properties can be easily obtained after finding the synchronization signals. This avoids the UE performing discovery burst measurements using the wrong time and/or frequency parameters. A UE could also avoid performing more complex and power consuming detection operations on other signals such as the DRS.

In some embodiments, the synchronization signal property is the time difference between a PSS and a SSS in a discovery burst. In some embodiments, the time difference is such that the SSS is transmitted in the OFDM (Orthogonal Frequency Division Multiplexing) symbol after the PSS. In some embodiments, the time difference is such that the SSS is transmitted three OFDM symbols after the PSS but other time differences and sequences are used in other embodiments. In some embodiments, the SSS is transmitted in the OFDM symbol after the PSS if FDD is used and the SSS is transmitted three OFDM symbols after the SSS if TDD is used.

In some embodiments, the synchronization signal property is the frequency difference between a PSS and a SSS in a discovery burst. In some embodiments, the synchronization signal property is one or more sequences used for the synchronization signals or combinations of such sequences, i.e. sequences used for synchronization signals or combinations thereof. In some embodiments, the synchronization signal sequence(s) and/or combinations are reserved for discovery bursts. In some embodiments, one or more PCIs are reserved for discovery bursts. In some embodiments a combination of the synchronization signals corresponds to a PCI that is part of a discovery burst. In some embodiments, the network assigns some physical cell identities (PCIs) to discovery bursts sent by sending cells and assigns other PCIs to legacy synchronization signals.

In some embodiments, the property is the correspondence between the PCI and a combination of sequences of the synchronization signals that include PSS and SSS's, and the UE determines if the synchronization signals are part of a discovery burst by determining if a combination of sequences used for the synchronization signals corresponds to a PCI that is used for the discovery bursts. In some embodiments, multiple signal properties, such as the aforementioned properties, are used by a UE to distinguish a discovery burst.

In some embodiments, a discovery burst contains multiple PSSs, i.e. multiple time-frequency locations for PSS. In some embodiments, the properties of those multiple PSSs are such that a UE can distinguish them from multiple legacy PSSs that are transmitted on the same frequency every 5 ms. In some embodiments, the multiple PSSs of a discovery burst are separated by less than 5 ms and in other embodiments, the discovery burst contains multiple PSSs within 1 ms.

In some embodiments, a discovery burst contains multiple secondary synchronization signals, i.e. multiple time-frequency locations for SSS. In some embodiments, the properties of those multiple SSSs are such that a UE can distinguish them from multiple legacy SSSs. Legacy SSSs from a cell may occur every 5 ms, but a cell transmits the same SSS every 10 ms in LTE as discussed in the background. In some embodiments, the multiple SSSs of a discovery burst are separated by less than 5 ms. In some embodiments, the multiple SSSs of a discovery burst include a legacy SSS, that is, an SSS that coincides in time and frequency with a legacy SSS. In some embodiments, the discovery burst with multiple SSSs uses the same sequence(s) for the different SSSs, i.e. a cell uses the same sequence for the different SSSs but another cell may use another sequence for the different SSSs. In some embodiments, a discovery burst with multiple SSSs uses different sequence(s) for the different SSSs, i.e. a cell uses different sequence(s) for the different SSSs.

In some embodiments, a discovery burst contains one or multiple PSSs and one or multiple SSSs. In one embodiment, the properties of those PSS(s) and SSS(s) are such that a UE can distinguish them from legacy PSSs/SSSs.

In some embodiments, a discovery burst synchronization signal property in the embodiments above is configurable. In some embodiments, a UE is informed by the serving cell of a property of a discovery burst synchronization signal. In some embodiments, the serving cell informs a UE of one or more identified synchronization signal properties that the UE compares to the detected properties when the UE detects the synchronization signals and the synchronization signal properties, in the discovery burst.

In some embodiments, a UE procedure for RRM measurement on a discovery burst includes the following steps shown in FIG. 1. At step 101, the UE detects synchronization signal(s) and, if needed, obtains synchronization with the sending cell using the detected synchronization signal(s). In some embodiments, coarse synchronization is obtained and in other embodiments, coarse or other synchronization is not needed. In some embodiments, the sending cell is a small cell that is a low power node (LPN) in a HetNet communication system. The synchronization signals are as described above. At step 103, the UE detects the synchronization signal properties and determines if the synchronization signals are part of a discovery burst based on the properties of the detected synchronization signal(s). Such synchronization signal properties are discussed above and include the time difference between a PSS and SSS in a discovery burst, the frequency difference between the PSS and the SSS in a discovery burst, the sequence of the synchronization signals, and other properties. As above, in some embodiments, the UE is informed by the serving cell of the property and compares the property furnished by the serving cell to the detected synchronization signal property. If the synchronization signals determined to be part of a discovery burst from the sending cell (step 105) because their detected properties are in accordance with the identified properties known to the UE, i.e. "Yes" 107, then the UE may perform RRM measurements on signals in the discovery burst from the sending cell, as in step 109 and such measurements may be referred to as "discovery RRM measurements". In some embodiments, the discovery RRM measurements may be made upon the DRS signal. If the synchronization signal(s) are not part of a discovery burst at step 105, i.e. "No" 111, i.e. the properties of the detected synchronization signal(s) are not according to the discovery burst properties known by the UE, the UE does not perform RRM measurements on other signals of a discovery burst, based on the coarse synchronization using the detected synchronization signal(s) such as at step 113. The discovery RRM measurements may include reference signal received power (RSRP) and reference signal received quality (RSRQ) measurements as discussed herein, or other measurements. Even though the UE does not perform discovery burst based RRM measurements in a search window (such as in many embodiments described herein), the UE may still perform legacy CRS based RRM measurements, e.g. in a search window. In various embodiments, the UE then sends the discovery RRM measurements made on the sending cell to the serving cell to determine if the UE should communicate with the measured, sending cell.

Figure 2:
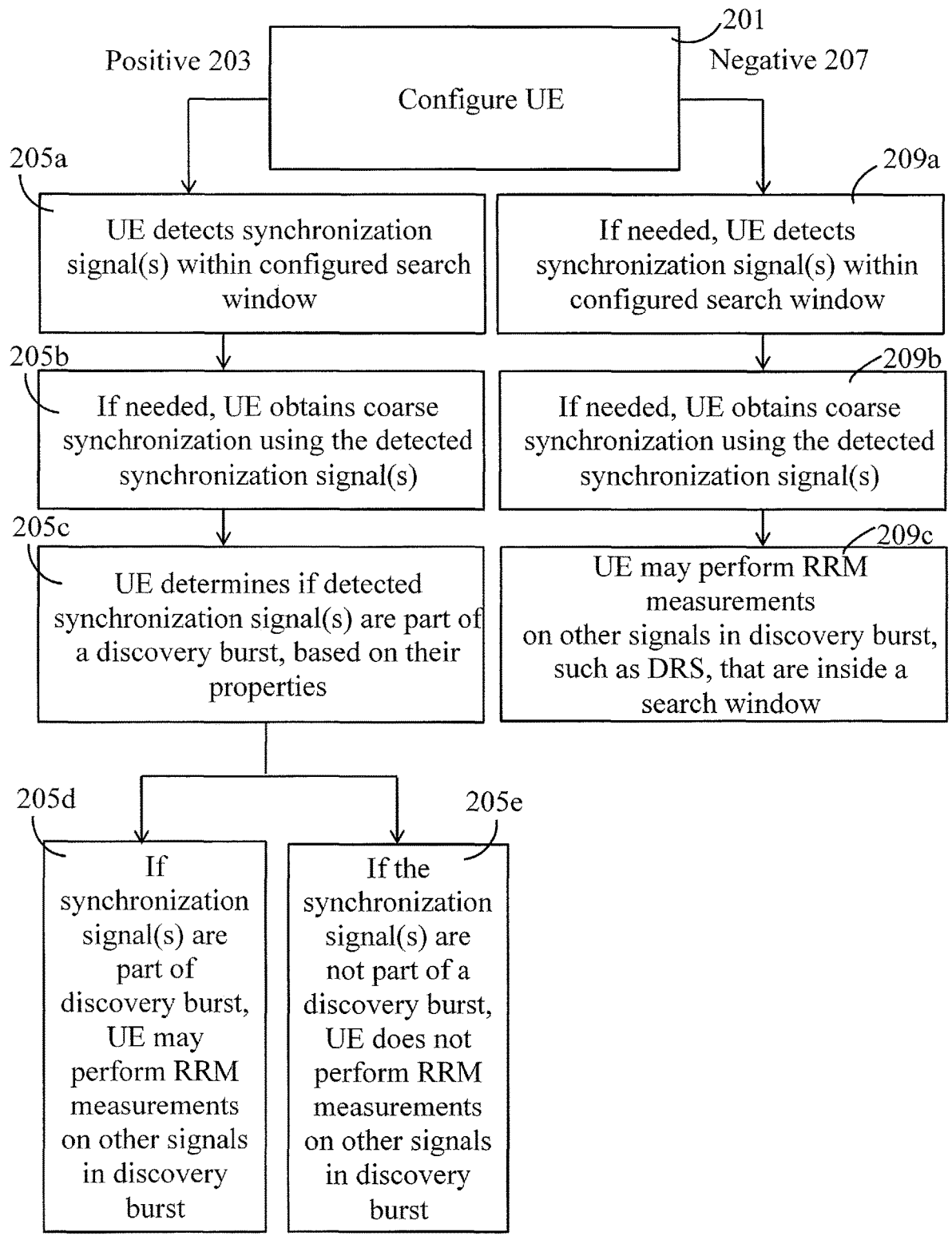
FIG. 2 is a flowchart illustrating a method according to various embodiments of the disclosure.

A UE procedure for RRM measurement on a discovery burst (i.e., "discovery RRM measurements") according to a search window embodiment, includes the following steps shown in FIG. 2. At step 201, the UE is configured whether or not to evaluate the properties of synchronization signal(s) detected within a configured search window. If positively configured to evaluate the properties of synchronization signal(s) detected within a configured search window ("positive" 203), the UE may also be configured to perform discovery RRM measurements on signals in the search window if and only if the UE determines that the detected synchronization signal(s) are part of a discovery burst. In various embodiments, the UE is configured by the serving cell. If the UE is positively configured in step 201, i.e. "positive" 203, the UE detects synchronization signal(s) within a configured search window at step 205a. At step 205b, the UE optionally obtains coarse synchronization using the detected synchronization signal(s) but in other embodiments, it may not be necessary to obtain coarse synchronization. At step 205c, the UE determines if the detected synchronization signal(s) are part of a discovery burst, based on their properties as described in conjunction with FIG. 1. Such synchronization signal properties are discussed above. If the synchronization signal(s) are part of a discovery burst based on their properties, the UE may perform RRM measurements on other signals in the discovery burst at step 205d. In some embodiments, the UE performs RRM measurements on a DRS, as such signal is part of the discovery burst inside the search window. If the synchronization signal(s) are not part of a discovery burst at step 205e the UE does not perform RRM measurements on other signals in the discovery burst.

If negatively configured in step 201, i.e "negative" 207, the UE is not configured to evaluate the properties of synchronization signal(s) within a configured search window. At step 209a, if needed, the detects synchronization signal(s) within a configured search window. At step 209b, the UE obtains coarse synchronization using the detected synchronization signal(s) if needed, as described above. The UE may perform RRM measurements on other signals in the discovery burst, such as DRS, if it is determined that such other signals are inside a search window, at step 209c, but the UE does not evaluate the properties of synchronization signal(s) if negatively configured.

In some embodiments where the discovery burst synchronization signal(s) are not needed, e.g. in steps 205a, 209a and 209b above, the search window is precisely specified such that the UE need not use the discovery burst synchronization signal(s) to obtain coarse synchronization. In some embodiments, a UE is explicitly configured such that the UE need not use the discovery burst synchronization signal(s) to obtain coarse synchronization. In some embodiments, the UE directly performs RRM measurements on other signals in the discovery burst, thus bypassing the use of discovery burst synchronization signal(s). One embodiment in which this bypassing the use of discovery burst synchronization signal(s) is possible is an embodiment in which the downlink transmissions of the serving cell and the cells or transmission points transmitting a discovery burst are sufficiently synchronized. Another embodiment in which this skipping synchronization signal(s) technique is possible, is an embodiment in which the serving cell and the cells or transmission points transmitting a discovery burst are connected with ideal backhaul.

In some embodiments, a UE is configured with measurement gaps to receive discovery bursts, such as described in Sesia et al, "LTE—The UMTS Long Term Evolution—From theory to practice", Wiley, 2011, the contents of which are hereby incorporated by reference as if set forth in their entirety. In some embodiments, when the serving cell operates on another carrier on which the discovery bursts are transmitted and the UE has a single receiver, the UE is advantageously configured with measurement gaps. In some embodiments, a search window configured for a UE falls within the UE's measurement gap. In some embodiments, a search window occurs periodically with the period being a multiple of the measurement gap period, so that each search window may occur in a measurement gap. In some embodiments, the search window is narrower than the measurement gap. In some embodiments, a search window for receiving discovery bursts defines by itself a new measurement gap, in addition to any configured legacy measurement gap, such that a UE can assume that it is not scheduled on the serving cell during a search window, or, in one embodiment, in subframes containing at least a part of a search window.

Figure 3:
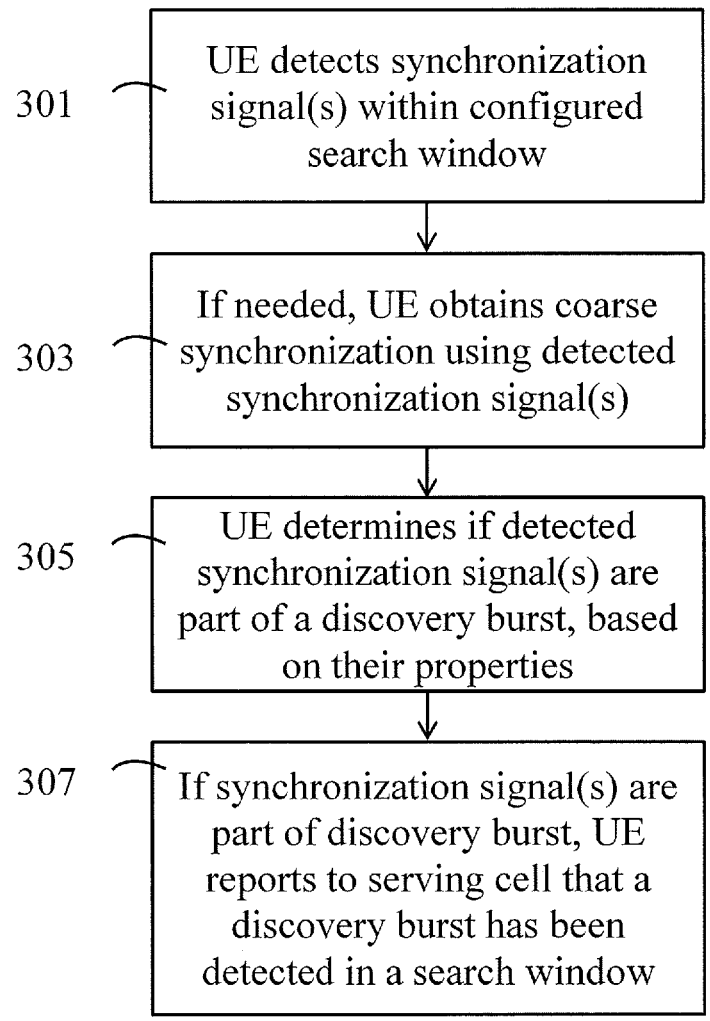
FIG. 3 is a flowchart illustrating a method according to various embodiments of the disclosure.

FIG. 3 illustrates an embodiment of a UE procedure for detecting and reporting detection of a discovery burst in a search window. In the embodiment of FIG. 3, the UE is configured whether or not to evaluate the properties of synchronization signal(s) detected within a configured search window, and report the detection of a discovery burst to the serving cell if the UE determines that the detected synchronization signal(s) are part of a discovery burst. If positively configured, then at step 301, the UE detects synchronization signal(s) within a configured search window, the search window configured by the serving cell in various embodiments. The synchronization signals are as described above. If needed, at step 303, the UE obtains coarse synchronization with the sending cell using the detected synchronization signal(s). At step 305, the UE determines if the detected synchronization signal(s) are part of a discovery burst, based on their properties, as described more fully above. If the synchronization signal(s) are part of a discovery burst, then at step 307, the UE reports to the serving cell that a discovery burst has been detected in the search window configured by the serving cell.

Figure 4:
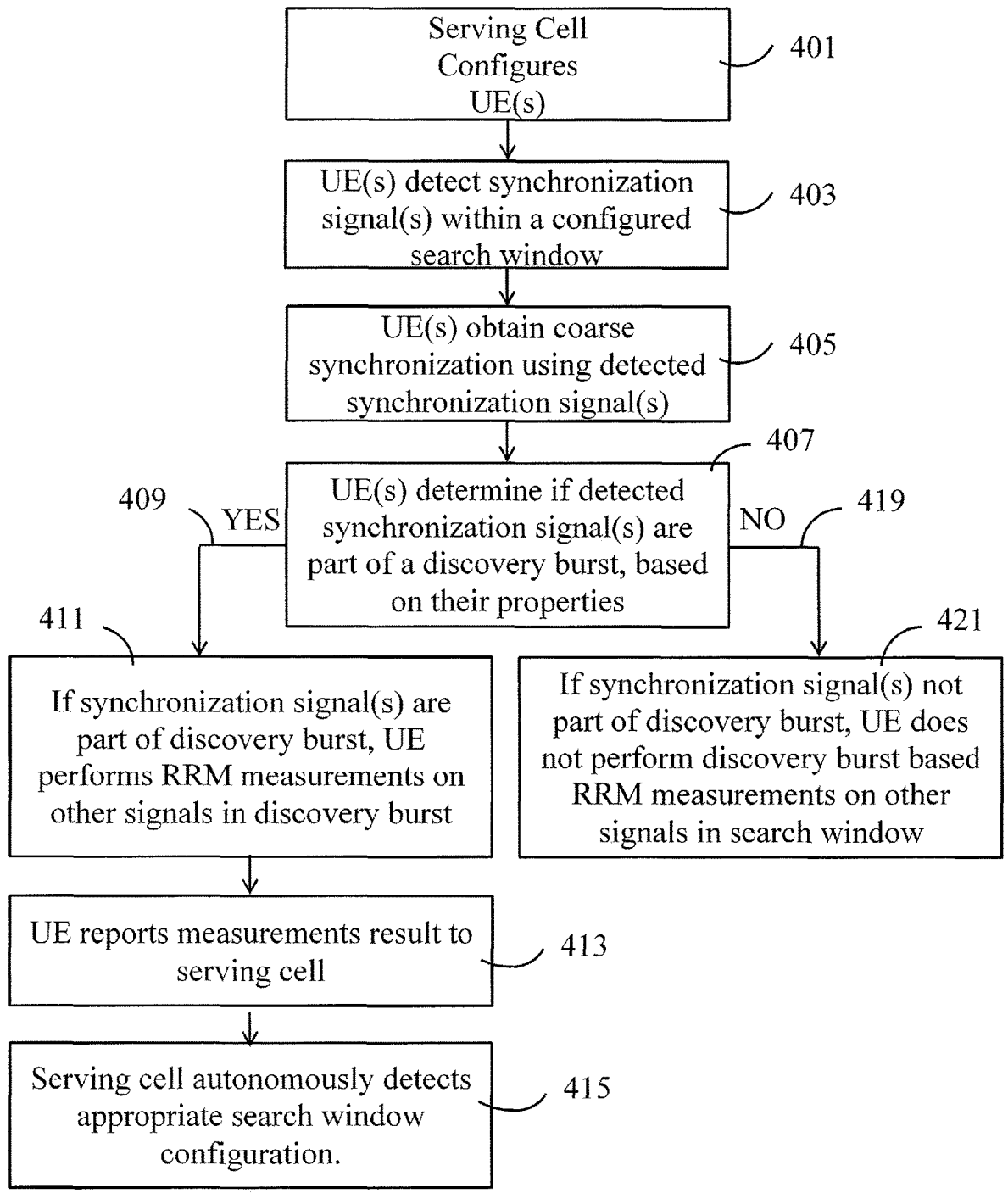
FIG. 4 is a flowchart illustrating a method according to various embodiments of the disclosure.

FIG. 4 illustrates an autonomous search window detection (ASWD) embodiment of a UE method in which a serving cell may have uncertain search window information, or no search window information at all. In such embodiments, a serving cell performs an autonomous, i.e. independent, detection of a search window that is sufficiently accurate for cell detection and RRM measurements. In various embodiments, the disclosure provides for the following steps. At step 401, UEs are configured by the serving cell. At step 401, the UE or UE's are configured to evaluate the properties of synchronization signal(s) detected within a configured search window, and to perform RRM measurements on signals in the search window if and only if the UE determines that the detected synchronization signal(s) are part of a discovery burst as described above. In some embodiments, the UE(s) are configured with different search windows. Different UEs can be configured with different search windows or a UE can be configured with one or multiple search windows, in particular a UE can be sequentially configured with different search window configurations, i.e. one at a time. The different search window configurations are such that at least one of the search windows should contain a discovery burst.

At step 403, at least one of the UE(s) detect synchronization signal(s) within one of the configured search windows provided by the serving cell. At step 405, the UE(s) optionally obtains coarse synchronization using the detected synchronization signal(s). In other embodiments, coarse synchronization is not obtained at step 405. At step 407, the UE(s) determine if the detected synchronization signal(s) are part of a discovery burst, based on their properties, as described above.

If the synchronization signal(s) are part of a discovery burst "yes" 409, a UE performs RRM measurements on other signals in the discovery burst at step 411. The RRM measurements are as described above and may be made on signals such as DRS, which are among other signals are inside the search window. At step 413, if the UE has performed RRM measurement on a discovery burst, the UE may report the result to the serving cell. At step 415, the serving cell autonomously detects an appropriate search window configuration. The serving cell knows the configured search window that enabled the UE to detect the synchronization signals in the discovery burst in the search window and to report discovery burst based RRM measurements to the serving cell. As such, the serving cell can therefore determine that such a search window configuration is appropriate, i.e. it contains the synchronization signals in the discovery burst. If, at step 407 the UE(s) determine that the detected synchronization signal(s) are not part of a discovery burst based on their properties, i.e., "no" 419, then the UE does not perform discovery burst based RRM measurements on other signals in the search window as indicated at step 421.

If the UE does not detect synchronization signal(s) within one of the configured search windows provided by the serving cell at step 403, then the UE will not perform discovery RRM measurement on a discovery burst and cannot and does not report the result to the serving cell as in step 413. In this scenario, then the UE may attempt to detect synchronization signal(s) within another one of the configured search windows provided by the serving cell such as at step 403. Alternatively or additionally, after a time having not received measurement reports from a UE, the serving cell will recognize that the configured search window configuration or configurations were not appropriate, and send reconfigured search windows to the UE such as at step 401, and the process continues as described. The reconfigured search windows may be configured one at a time and in some embodiments, the UE detects synchronization signal(s) within one of the reconfigured search windows provided by the serving cell, i.e. not one of the initial search windows configured by the search window.

The disclosure provides the following advantage. If a UE with a wrong search window configuration in step at step 411, would have proceeded to perform RRM measurements on what it the UE considered to be the DRS, the UE might have measured high power (of some other signal) and reported the result. The UE would typically have determined the time and frequency location of the DRS based on the time and frequency location of the detected synchronization signal(s). The method of the disclosure avoids this problem. With the method of the disclosure, the UE first determines if the detected synchronization signal(s) are part of a discovery burst before performing RRM measurements. Therefore, erroneously reported results are avoided and autonomous search window detection is enabled.

In some embodiments, a UE is configured to detect if and/or how much the relative timing difference between the synchronization signal(s) and the configured search window changes with time. In some embodiments, a UE is configured to report this change in the relative time difference to the serving cell. This could help the serving cell to adjust the search window configurations to better capture discovery bursts.

The word "exemplary" is used herein to mean "serving as an example or illustration." Any aspect or design described herein as "exemplary" is not necessarily to be construed as preferred or advantageous over other aspects or designs.

The preceding merely illustrates the principles of the disclosure. It will thus be appreciated that those of ordinary skill in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

While one or more embodiments of the invention have been described above, it should be understood that they have been presented by way of example only, and not by way of limitation. The disclosure is not restricted to the illustrated example architectures or configurations, but can be implemented using a variety of alternative architectures and configurations.

One or more of the functions described in this document may be performed by an appropriately configured module. The term "module" as used herein, can refer to hardware, firmware, software and any associated hardware that executes the software, and any combination of these elements for performing the associated functions described herein. Additionally, various modules can be discrete modules; however, as would be apparent to one of ordinary skill in the art, two or more modules may be combined to form a single module that performs the associated functions according to various embodiments of the invention. Conversely, a single module may be divided into two or more modules that perform respective associated functions according to various embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

According to various aspects of the disclosure, provided is a method and a non-transitory computer-readable storage medium comprising computer-executable program code, the program code when executed by a processor performing a method for wireless communication in a wireless communication system. The method comprises a user equipment (UE) detecting synchronization signals and obtaining coarse synchronization with a cell using the detected synchronization signals; the UE determining if the synchronization signals are part of a discovery burst based upon properties of the detected synchronization signals; and if the synchronization signals are part of the discovery burst, the UE performing discovery radio resource management (RRM) measurements on signals in said discovery burst.

According to another aspect of the disclosure, provided is a method and a non-transitory computer-readable storage medium comprising computer-executable program code, the program code when executed by a processor performing a method for wireless communication in a wireless communication system. The method comprises a serving cell configuring a user equipment (UE) with a search window; the UE detecting synchronization signals within the configured search window; the UE determining if the detected synchronization signals are part of a discovery burst, based on properties of the detected synchronization signals; and the UE performing discovery radio resource management (RRM) measurements on signals in the discovery burst if the synchronization signals are part of the discovery burst and the UE not performing RRM measurements on signals in the discovery burst if the synchronization signals are not part of the discovery burst.

According to another aspect of the disclosure, provided is a method and a non-transitory computer-readable storage medium comprising computer-executable program code, the program code when executed by a processor performing a method for wireless communication in a wireless communication system. The method comprises a serving cell configuring a UE with a plurality of search window configurations which may be in succession. In some embodiments, the serving cell configures the UE with one search window configuration at a time, then subsequently reconfigures the UE with a plurality of search window configurations if the UE does not detect synchronization signals within one of the configured search window configurations. The method also includes the UE detecting synchronization signals within a detected configured search window configuration of the plurality of configured search window configurations; the UE obtaining coarse synchronization with a sending cell using the detected synchronization signals; and the UE determining if the synchronization signals are part of a discovery burst sent by the sending cell, based upon properties of the detected synchronization signals. The method also comprises the UE performing discovery RRM measurements on signals in the discovery bursts if the synchronization signals are part of said discovery burst; the UE reporting results of the discovery RRM measurements to the serving cell if the synchronization signals are part of the discovery burst; and the serving cell autonomously determining that the detected configured search window configuration is an appropriate search window configuration that contains the discovery burst.

According to another aspect of the disclosure, provided is a method and a non-transitory computer-readable storage medium comprising computer-executable program code, the program code when executed by a processor performing a method for wireless communication in a wireless communication system. The method comprises a serving cell configuring a plurality of UE's with a plurality of search window configurations; a first UE of the plurality of UEs detecting synchronization signals within a first configured search window of the plurality of search window configurations; the UE obtaining coarse synchronization with a sending cell using the detected synchronization signals; the UE determining if the synchronization signals are part of a discovery burst sent by the sending cell, based upon properties of the detected synchronization signals; the UE performing discovery RRM measurements on signals in the discovery bursts if the synchronization signals are part of the discovery burst; the UE reporting results of the discovery RRM measurements to the serving cell if the synchronization signals are part of the discovery burst; and the serving cell autonomously determining that the first configured search window configuration is an appropriate search window configuration that contains the discovery burst.

According to another aspect of the disclosure, provided is a method and a non-transitory computer-readable storage medium comprising computer-executable program code, the program code when executed by a processor performing a method for wireless communication in a wireless communication system. The method comprises a user equipment (UE) detecting synchronization signals that include PSS and SSS signals and obtaining synchronization with a cell using the detected synchronization signals; and the UE determining if the synchronization signals are part of a discovery burst by determining if a combination of sequences used for synchronization signals, corresponds to a PCI that is used for discovery bursts.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

This description of the embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments, which may be made by those skilled in the art without departing from the scope and range of equivalents of the invention.

What is claimed is:

1. A method for wireless communication, said method comprising:
    a user equipment (UE) detecting synchronization signals and obtaining synchronization with a cell using said detected synchronization signals;
    said UE determining if said synchronization signals are part of a discovery burst based upon properties of said detected synchronization signals, wherein the UE is configured to evaluate the properties of said detected synchronization signals without the cell informing the UE of the properties;
    when said synchronization signals are part of said discovery burst as determined by said UE, said UE performing discovery radio resource management (RRM) measurements on signals in said discovery burst, wherein the properties comprise a frequency difference between a primary synchronization signal (PSS) and a secondary synchronization signal (SSS), wherein the frequency difference between the PSS and the SSS indicates whether the synchronization signals are part of the discovery burst; and
    reporting results of the RRM measurements to the cell.

2. The method as in claim 1, further comprising a serving cell configuring said UE with identified synchronization signal properties, and wherein said UE determining includes said UE determining said properties of said detected synchronization signals and determining that said synchronization signals are not part of said discovery burst because said properties of said detected synchronization signals are not in accordance with said identified synchronization signal properties.

3. The method as in claim 1, wherein said obtaining synchronization comprises obtaining coarse synchronization and said signals include a discovery reference signal (DRS).

4. The method as in claim 1, wherein said discovery RRM measurements are carried out on said cell and further comprising said UE reporting said discovery RRM measurements to a serving cell.

5. The method as in claim 1, further comprising a serving cell configuring said user equipment (UE) with a search window, wherein said UE detecting synchronization signals includes said UE searching for said synchronization signals within said configured search window.

6. The method as in claim 5, wherein said search window configured for said UE falls within a measurement gap of said UE.

7. The method as in claim 1, wherein said discovery RRM measurements include reference signal received power (RSRP) and reference signal received quality (RSRQ) measurements, and said synchronization signals include at least one of a primary synchronization signal (PSS) and a secondary synchronization signal (SSS).

8. The method as in claim 1, wherein said discovery burst includes at least one of a primary synchronization signal (PSS), a secondary synchronization signal (SSS), a discovery reference signal (DRS), and a channel state information reference signal (CSI-RS).

9. The method as in claim 1, wherein said synchronization signals include PSS and SSS signals, said discovery burst comprises one or more sequences used for said synchronization signals, said sequences including sequences used for PSS signals and sequences used for SSS signals, and combinations of said sequences correspond to physical cell IDs (PCIs).

10. The method as in claim 1, wherein said synchronization signals include a plurality of secondary synchronization signals and wherein said properties include at least one of separation time between secondary synchronization signals and a sequence of said secondary synchronization signals.

11. The method as in claim 1, further comprising said UE determining if said synchronization signals are legacy signals that are not part of said discovery burst based upon said properties.

12. The method as in claim 1, wherein said UE determining comprises said UE distinguishing synchronization signals of said discovery burst from legacy synchronization signals.

13. A method for wireless communication, said method comprising:
    a serving cell configuring a user equipment (UE) with a search window;
    said UE detecting synchronization signals within said search window;
    said UE determining whether said detected synchronization signals are part of a discovery burst, based on properties of said detected synchronization signals, wherein the UE is further configured to evaluate the properties of the synchronization signals detected within said search window without the serving cell informing the UE of the properties;

said UE performing discovery radio resource management (RRM) measurements on signals in said discovery burst when said synchronization signals are part of said discovery burst and said UE not performing RRM measurements on signals in said discovery burst when said synchronization signals are not part of said discovery burst, wherein the properties comprise a frequency difference between a primary synchronization signal (PSS) and a secondary synchronization signal (SSS)), wherein the frequency difference between the PSS and the SSS indicates whether the synchronization signals are part of the discovery burst; and said UE reporting results of the RRM measurements to the serving cell.

14. The method as in claim 13, further comprising said UE reporting said detected synchronization signals to said serving cell if said UE determines that said detected synchronization signals are part of a discovery burst.

15. The method as in claim 13, wherein said signals are inside said search window and include a discovery reference signal (DRS).

16. The method as in claim 13, wherein one of said properties is a sequence used for one of said synchronization signals.

17. The method as in claim 13, wherein said UE determining includes said UE determining if said synchronization signals are legacy signals that are not part of said discovery burst, based upon said properties.

18. The method as in claim 13, wherein said properties further include a sequence used for said synchronization signals.

19. A method for wireless communication, said method comprising:

a serving cell configuring a UE with a plurality of search window configurations;

said UE detecting synchronization signals within a detected search window configuration of said plurality of search window configurations;

said UE obtaining coarse synchronization with a sending cell using said detected synchronization signals;

said UE determining whether said synchronization signals are part of a discovery burst sent by said sending cell, based upon properties of said detected synchronization signals, wherein the UE is configured to evaluate the properties of said detected synchronization signals without the serving cell informing the UE of the properties;

said UE performing discovery RRM measurements on signals in said discovery bursts when said synchronization signals are part of said discovery burst;

said UE reporting results of said discovery RRM measurements to said serving cell, when said synchronization signals are part of said discovery burst; and said serving cell autonomously determining that said detected configured search window configuration is an appropriate search window configuration that contains said discovery burst, wherein the properties comprise a frequency difference between a primary synchronization signal (PSS) and a secondary synchronization signal (SSS) in said discovery burst), and wherein the frequency difference between the PSS and the SSS indicates whether the synchronization signals are part of the discovery burst.

20. The method as in claim 19, wherein said properties further include a sequence used for said synchronization signals.

21. A method for wireless communication, said method comprising:

a serving cell configuring a plurality of UE's with a plurality of search window configurations;

a first UE of said plurality of UEs detecting synchronization signals within a first configured search window configuration of said plurality of search window configurations;

said first UE obtaining coarse synchronization with a sending cell using said detected synchronization signals;

said first UE determining if said synchronization signals are part of a discovery burst sent by said sending cell, based upon properties of said detected synchronization signals, wherein the first UE is configured to evaluate the properties of said detected synchronization signals without the serving cell informing the UE of the properties;

said first UE performing discovery RRM measurements on signals in said discovery burst if said synchronization signals are part of said discovery burst;

said first UE reporting results of said discovery RRM measurements to said serving cell if said synchronization signals are part of said discovery burst; and said serving cell autonomously determining that said first configured search window configuration is an appropriate search window configuration that contains said discovery burst, wherein the properties comprise a frequency difference between a primary synchronization signal (PSS) and a secondary synchronization signal (SSS)), and wherein the frequency difference between the PSS and the SSS indicates whether the synchronization signals are part of the discovery burst.

22. The method as in claim 21, wherein said properties further include a sequence used for said synchronization signals.

23. A wireless communication system comprising:

a serving cell adapted to configure a user equipment (UE) with a search window;

said UE configured to detect synchronization signals within said configured search window;

said UE configured to determine if said detected synchronization signals are part of a discovery burst sent by a sending cell, based upon properties of said detected synchronization signals, wherein the UE is configured to evaluate the properties of the detected synchronization signals without the serving cell informing the UE of the properties; and said UE configured to perform discovery radio resource management (RRM) measurements on signals in said discovery burst when said synchronization signals are part of said discovery burst and report results of the RRM measurements to the serving cell, and wherein said UE is further configured to not perform discovery RRM measurements on signals in said search window when said synchronization signals are not part of said discovery burst, wherein the properties comprise a frequency difference between a primary synchronization signal (PSS) and a secondary synchronization signal (SSS)), and wherein the frequency difference between the PSS and the SSS indicates whether the synchronization signals are part of the discovery burst.

24. The wireless communication system as in claim 23, wherein said UE is further configured to obtain coarse synchronization with said sending cell using said detected synchronization signals.

25. The wireless communication system as in claim 23, wherein said properties include a combination of sequences used for said synchronization signals, that corresponds to a PCI.

26. The wireless communication system as in claim 23, wherein said UE configured to determine includes said UE configured to detect said properties and to determine if said synchronization signals are legacy signals that are not part of said discovery burst, based on said properties.

27. The wireless communication system as in claim 23, further comprising said UE configured to report said discovery RRM measurements to said serving cell.

28. A non-transitory computer readable storage medium comprising computer-executable program code, the program code when executed by a processor performing a method for wireless communication in a wireless communication system, said method comprising:
   a user equipment (UE) detecting synchronization signals and obtaining coarse synchronization with a cell using said detected synchronization signals;
   said UE determining if said synchronization signals are part of a discovery burst based upon properties of said detected synchronization signals, wherein the UE is configured to evaluate the properties of said detected synchronization signals without the cell informing the UE of the properties; and
   when said synchronization signals are part of said discovery burst, said UE performing discovery radio resource management (RRM) measurements on signals in said discovery burst and reporting results of the RRM measurements to the cell, and said UE not performing RRM measurements on signals in said search window when said synchronization signals are not part of said discovery burst,
   wherein the properties comprise a frequency difference between a primary synchronization signal (PSS) and a secondary synchronization signal (SSS)), and wherein the frequency difference between the PSS and the SSS indicates whether the synchronization signals are part of the discovery burst.

29. The non-transitory computer readable storage medium as in claim 28, wherein said method further comprises a serving cell informing said UE of identified synchronization signal properties, and wherein said UE determining includes said UE determining said properties of said detected synchronization signals and determining that said synchronization signals are not part of said discovery burst if said properties of said detected synchronization signals are not in accordance with said identified synchronization signal properties.

30. The non-transitory computer readable storage medium as in claim 28, wherein said signals include channel state information reference signals (CSI-RS), said UE determining includes said UE determining said properties of said detected synchronization signals, said method further comprising said UE synchronizing with said cell if said synchronization signals are part of said discovery burst and reporting said discovery RRM measurements to a serving cell.

* * * * *